April 1, 1930.　　　A. J. ELLIS　　　1,753,045
HAME CONNECTER
Filed April 15, 1929
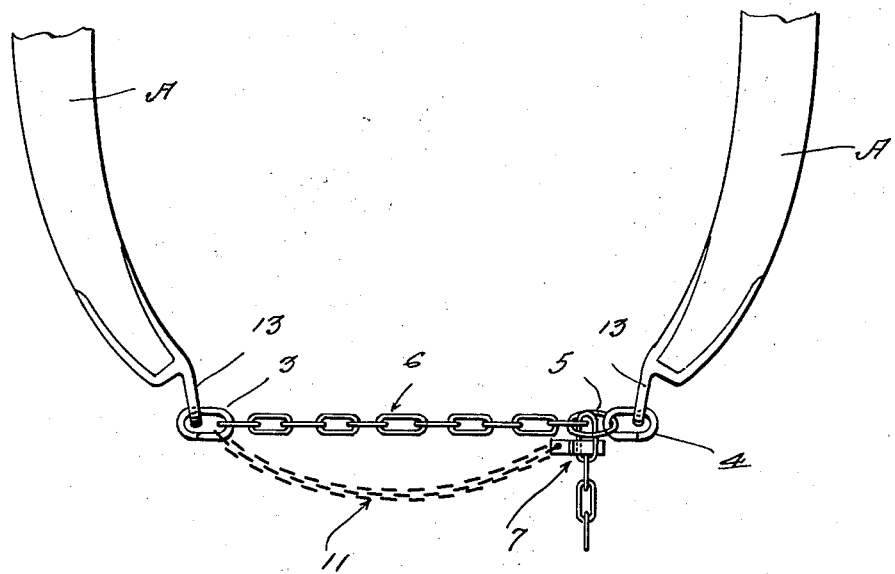
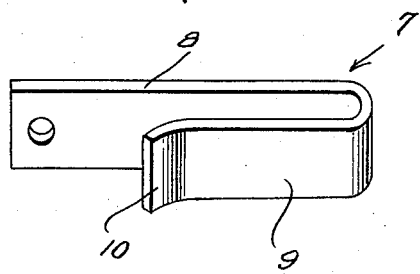
Inventor
A. J. Ellis
By Clarence A. O'Brien
Attorney Patented Apr. 1, 1930

1,753,045

UNITED STATES PATENT OFFICE

ALBERT J. ELLIS, OF BOLTON, NORTH CAROLINA

HAME CONNECTER

Application filed April 15, 1929. Serial No. 355,277.

This invention relates to an improved hame connecter intended to be substituted for ordinary connecting straps and strings.

My principal aim is to generally improve upon inventions of this class by providing a structure which is more reliable, of greater strength, easier to attach and detach, economical, practicable, and capable of fulfilling the requirements of an invention of this class in a highly satisfactory manner.

Other features and advantages of the invention will become more readily apparent from the following description and drawings.

In the drawings:

Figure 1 is an elevational view of the connecter in place.

Figure 2 is a perspective view of a retaining clip or keeper, constituting an important part of the structure.

In the drawings, the reference character A designate portions of an ordinary hame structure, these being provided at their lower ends with customary eyes B. An open link 3 is connected with one eye and a similar open link 4 is connected with the remaining eye. These links are of a form wherein the ends are separated and disposed in overlapping spaced relation so that they may be detached or removed whenever necessary or reversed. The link 4 carries a ring 5. The connecter chain 6 is connected at one end to the link 3 and its free end portion extends down through the ring 5.

That particular link of the chain which passes through the ring 5 serves to accommodate the retaining clip or keeper 7. This clip comprises a shank 8 having a hook 9 with a flared extremity 10. A suspension and retaining chain 11 is connected with the shank.

In practice, the free end portion of the connecter chain is drawn through and downwardly against the ring 5. Then the hooked retainer 7 is engaged with a link as shown in Figure 1, whereby to hold the lower end portions of the hame sections together.

A hame connecter of this class is unusually efficient in performance, susceptible of ready and easy application and removable, and further susceptible of rapid adjustment. Moreover, it is positive and dependable in action, practical and modern. These and other advantages and features of the invention have doubtless been made apparent from the description in conjunction with the drawings. Therefore a more lengthy description is regarded as unnecessary.

Minor changes in the shape, size and rearrangement of details coming within the field of the invention claimed may be resorted to, in actual practice if desired.

I claim:

1. In a structure of the class described, in combination, a pair of complemental hame sections provided at their lower ends with eyes, open links detachably connected with said eyes, a chain connected at one end with one link, a ring connected with the remaining link, the free end of said chain being adapted to extend down through said ring, and a keeper adapted for detachable engagement with the free end portion of said chain, together with a secondary retaining chain for said keeper connected to one of the links.

2. In a structure of the class described, in combination, a pair of complemental hame sections provided at their lower ends with eyes, open links detachably connected with said eyes, a chain connected at one end with one link, a ring connected with the remaining link, the free end of said chain being adapted to extend down through said ring, and a keeper adapted for detachable engagement with the free end portion of said chain, said keeper comprising a hook shaped clip, the free end of the hook of which is flared outwardly to facilitate engagement with the connecter chain.

In testimony whereof I affix my signature.

ALBERT J. ELLIS.